April 5, 1949. G. P. ANDERSON 2,466,349
ELECTRIC COOKER
Filed Nov. 17, 1943 2 Sheets-Sheet 1
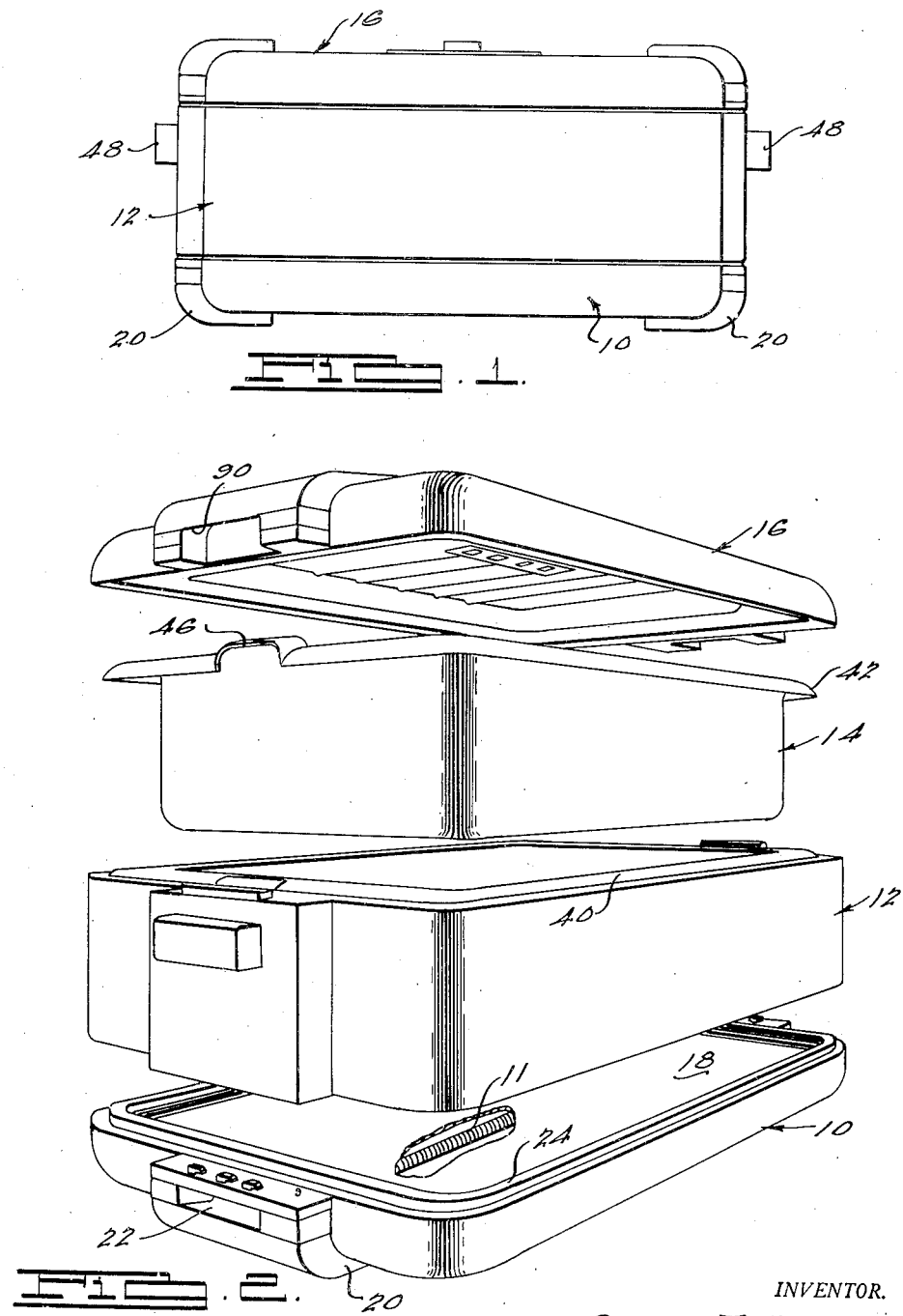
INVENTOR.
George P. Anderson.
BY
Edwin J. Balluff
ATTORNEY.

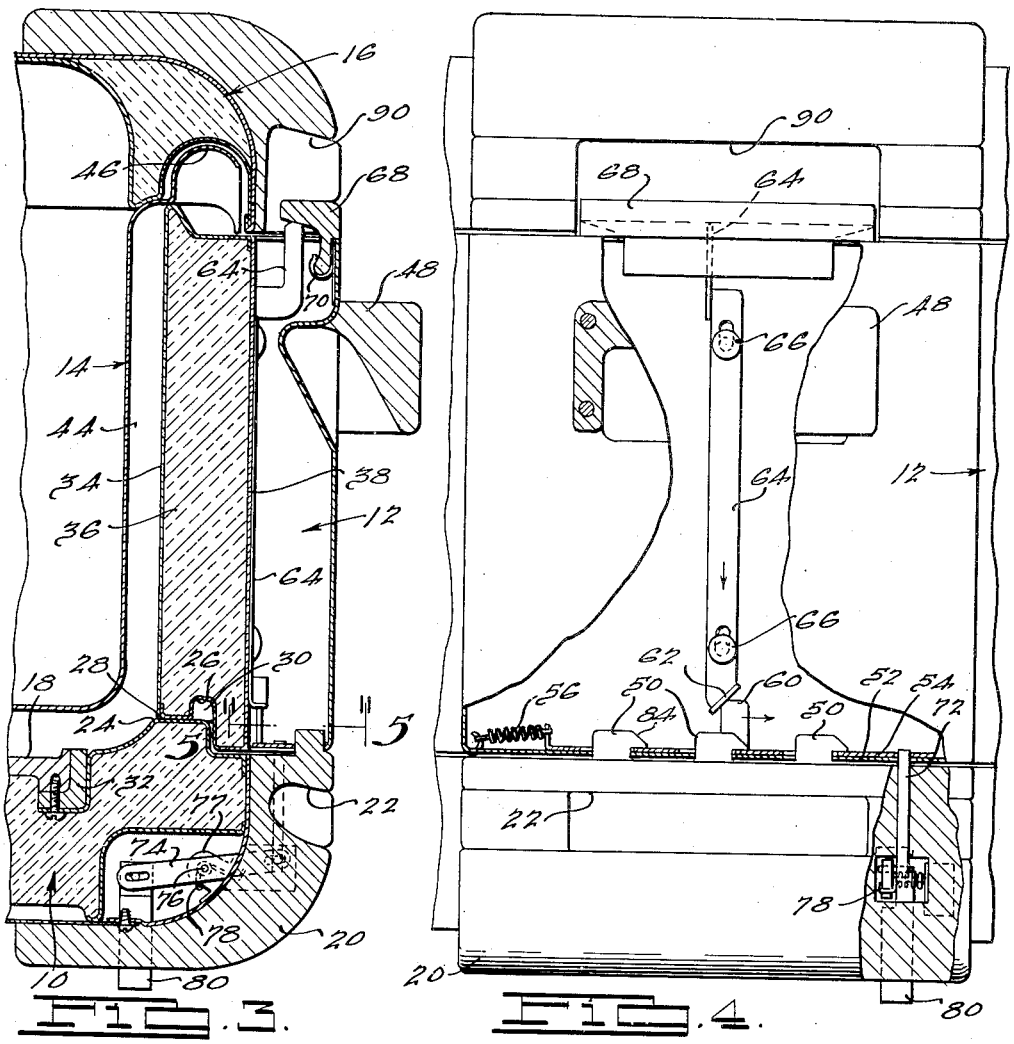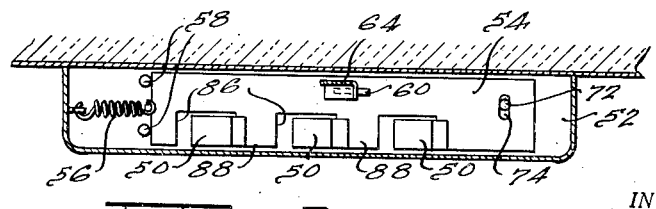

Patented Apr. 5, 1949

2,466,349

UNITED STATES PATENT OFFICE 2,466,349

ELECTRIC COOKER

George P. Anderson, Detroit, Mich., assignor to McCord Corporation, a corporation of Maine Application November 17, 1943, Serial No. 510,845

5 Claims. (Cl. 219—35)

This invention relates to an electric cooker or roaster of the domestic type and has reference to a new type of construction and arrangement of the parts thereof in order to make the appliance useful for many different kinds of cooking operations.

Principal objects of the invention are to provide:

A new and improved type of electric cooker;

An electric cooker construction in which the parts thereof are readily separable in order to permit the use of the parts as a unit or certain of the parts individually for different types of cooking operations;

A cooker construction in which the parts are readily separable and in which means are provided whereby the cooker may be handled as a unit or certain parts thereof may be readily removed therefrom;

A cooker construction in which the base thereof may or may not be picked up with the rest of the unit and in which locking means are provided for releasably locking the base to the remainder of the unit, together with means for preventing the release of the locking means when the unit is being carried.

Other objects and advantages of the invention will be apparent from a consideration of the following specification taken in conjunction with the accompanying drawings, of which there are two sheets and wherein:

Fig. 1 is a side elevation view of a cooker embodying the invention;

Fig. 2 is a perspective exploded view of the major parts thereof;

Fig. 3 is a fragmentary sectional view of one end of the cooker illustrating the manner in which the major parts thereof are releasably locked together;

Fig. 4 is a fragmentary end elevational view of the cooker with certain parts thereof broken away in order to show certain details of the locking mechanism; and Fig. 5 is a horizontal sectional fragmentary view of the lock between the base of the cooker and the remainder thereof.

The cooker in general includes a base 10, a shell 12, a pan 14, and a cover 16. These parts when assembled as illustrated in Fig. 1 form a unit which is sometimes referred to as a cooker or a roaster. The base 10 preferably may include a cooking surface or plate 18 upon which certain types of cooking may be performed, such as grilling, frying, or toasting various kinds of foods. The cooking surface 18 also may function as a hot plate for heating various kinds of cooking vessels that may be set thereon. The use of the base 10 for the foregoing functions may be obtained when the base 10 is separated from the remainder of the cooker.

The base 10 includes legs or supports 20 by means of which the base may be suitably supported upon a surface, and recessed portions 22 of the legs 20 at each end of the base may be provided to form a pair of handles by means of which the base may be handled. The base 10 has arranged therein suitable electric resistance heating elements 11 which are adapted to be supplied with current under the control of a suitable switch and thermostat (not shown) in order that the heat of the plate 18 may be selected for the particular type of cooking operation desired. Since the details of the construction and arrangements of the electric resistance heating elements form no part of the present invention, these have not been illustrated and any desired or preferred construction may be employed.

The cooking surface 18 preferably is smooth and of such a nature as to make it possible to perform cooking operations such as frying or grilling directly thereon. The cooking surface may be surrounded by an upstanding rib 24 which also functions to form part of a seat for the complementarily shaped seat formed around the lower edge of the shell 12.

The shell 12 comprises a hollow section which is adapted to be removably seated upon the base 10 and to form a well or space for receiving the pan 14. As illustrated in Fig. 3, the rib 24 forms part of a seat which is adapted to receive, locate, and support the shell 12, upon the base 10, the seat on the lower edge of the shell being complementary to that of the seat on the base 10 so as to form a good joint therebetween. In addition, the lower edge of the shell 12 may be provided with a groove 28 in the seat 26 and in which groove a gasket 30 is arranged, the gasket cooperating with the rib 24 to form a seal in the joint between the base 10 and the shell 12.

The cooking surface 18 is exposed to the space enclosed by the shell 12 and is adapted to heat the air in such space. The cooking surface 18 may consist of a plate, the edges of which are supported by a seat 32 formed of suitable insulating material, such seat in turn being supported in a shoulder formed in the base 10, thereby providing a thermal break between the cooking surface 18 and the metal walls of the base 10. In addition, insulating material may be arranged in the space in the base not otherwise occupied in order to reduce the loss of heat through the sides and bottom of the base 10.

The shell 12 consists essentially of an insulated wall formed by an inner wall 34, insulation 36, and an outer wall 38. The upper rim 40 of the shell 12 is formed to provide a seat for the rim or marginal flange 42 of the pan 14 in order that the pan 14 may be supported by the shell 12, and within the space enclosed thereby. The size of the pan 14 is somewhat less than the interior dimensions of the shell 12 in order to provide between the side walls of the pan 14 and the inner wall 34 of the shell a continuous space 44. The bottom of the pan 14 is arranged in spaced relationship with the cooking surface 18. When the pan 14 is assembled on the shell 12 as illustrated in Figs. 3 and 4, the rim 42 of the pan cooperates with the rim 40 of the shell to close the space 44 at the top, thereby defining an enclosed space between the pan and the shell and the base.

The cooking surface 18 when heated will heat the air in contact therewith and adjacent thereto, and set up a thermal air circulation by means of which heat is transferred to the walls and the bottom of the pan 14. In addition, the pan 14 will be heated by radiant heat from the cooking surface 18. Parts of the rim 42 at the ends of the pan may be formed to provide handles 46 which permit the pan to be lifted out of the well provided by the shell 12 and the base 10. At each end the shell 12 is provided with a handle 48. When the shell 12 is seated on the base 10, as illustrated in Figs. 1, 3, 4 and 5, the shell 12 is locked to the base 10 so as to form a unit which may be carried by means of the handles 48.

However, in order to permit the lifting of the shell 12 without the base 10, a releasable locking mechanism is provided between the shell 12 and base 10 and which comprises the following: At each end of the base a plurality of keepers 50 are provided. These are adapted to project upwardly through suitable openings in a horizontal wall 52 on the shell 12 when the latter is seated on the base 10, as illustrated in Figs. 3, 4 and 5. A latch bar 54 is slidably mounted on the wall 52 and is provided with suitable slots for accommodating the keepers 50. The latch bar 54 is biased to a locking engagement with keepers 50 by a spring 56, one end of the spring being connected to the bar 54 while the other end of the spring is anchored to a wall of the shell 12. Pins 58 upstanding from the wall 52 limit the movement of the latch bar 54 under the influence of the spring 56. The latch bar is provided with an upstanding arm 60 which is positioned to be acted on by a cam 62 carried on the lower end of a slide 64, the slide 64 being mounted for vertical slidable movement on the shell 12 by pins 66. A release button 68 pivotally mounted in a spring clip 70 is engageable with the upper end of the slide 64 so that when the button 68 is depressed the cam 62 cooperating with the arm 60 will slide the latch bar 54 to the right (Fig. 4) and disengage the latch bar from the keepers 50, thereby releasing the lock between the shell 12 and the base 10. The button 68 is positioned just above the handle 48 and so as to be actuated by the thumb of the hand while the fingers thereof are hooked under the handle 48. In this manner when the fingers are engaged with the handle 48 the button 68 may or may not be manipulated to release the lock between the base and the shell.

In order to prevent the release of the lock between the base and the shell when the unit is being carried, a safety lock is provided which is rendered inoperable when the base 10 is set on a table. This safety lock includes a plunger 72 which is slidably mounted on the base 10 and which is adapted to project through a slot or hole 74 in the latch bar 54, thereby preventing shifting of the latch bar under the influence of the button 68 when the unit is being carried. The plunger 72 is mounted for vertical movement on one end of a lever 74 pivoted at 76 on a pin which is carried by bracket 77. A spring 78 coiled around the pivot pin has one end anchored to the bracket 77 and the other end bearing on the lever 74 so as to bias the plunger 72 to the position illustrated in Fig. 4. A plunger 80 mounted for vertical movement is pivotally connected to the other end of the lever 74 and projects below the leg 20 of the base when the cooker is being carried. This plunger 80 is adapted to engage the surface upon which the base is supported and to be moved thereby for retracting the plunger 72 from the hole 74 in order to permit the latch bar 54 to be released if desired when the shell and base are setting on a supporting surface. In this manner the shell may not be separated from the base when the shell and the base are being carried by the handles 48.

In Figs. 3 and 4 the construction of one end of the roaster is illustrated, and it is to be understood that the construction of the other end of the roaster is the same. The spring 56 holds the latch bar 54 in the position illustrated in Figs. 4 and 5 so that if the shell 12 is separated from the base 10, the shell 12 may be automatically locked to the base merely by properly arranging the shell on the base 10. The upper surfaces of the keeper 50 are beveled as indicated at 84 so that the keepers 50 may project through the slots 86 in the latch bar and engage with the locking portions 88 thereof.

The cover, as illustrated, may be of dome shape and have its lower rim shaped to seat upon the upper rim of the pan 14 or the upper rim 40 of the shell 12 if the pan 14 is removed from the shell. Handles 90 may be provided at each end of the cover for handling the same, and these handles 90 are formed by suitable recesses in which the buttons 68 may be arranged.

While the invention has been described with some detail, it is to be understood that the description is for the purpose of illustration only and is not definitive of the limits of the inventive idea. The right is reserved to make such changes in the details of construction and arrangement of parts as will fall within the purview of the attached claims.

I claim:

1. A portable electric cooker comprising a base unit having heating means associated therewith, an insulated shell removably seated upon said base and cooperating therewith to define an enclosed cooking space open at the top which is arranged to be heated by said heating means and adapted to receive food supporting means, said shell having handles, quickly detachable automatic locking means operatively associated with said base and shell for releasably locking said base assembled to said shell upon seating said shell on said base so that when said shell is lifted by means of said handles, said base will be attached thereto and form a unit therewith, and means operable for releasing said locking means, said means including a finger engageable member arranged on said shell and positioned adjacent said handles.

2. A portable electric cooker comprising a base unit having heating means associated therewith, an insulated shell removably seated upon said base and cooperating therewith to define an enclosed cooking space which is arranged to be heated by said heating means and adapted to receive food supporting means, said shell having handles, quickly detachable automatic locking means operatively associated with said base and shell for releasably locking said base to said shell upon seating said shell on said base so that when said shell is lifted by said handles, said base will be attached thereto and form a unit therewith, means operable for releasing said locking means and positioned adjacent said handles, and means actuated by lifting of the shell, with the base secured thereto, from a supporting surface to prevent the release of said locking means.

3. A portable electric cooker comprising a base having a cooking surface, a shell removably seated upon said base and cooperating therewith to define a cooking space above said cooking surface, food supporting means adapted to be arranged in said space for supporting food to be cooked therein, a cover for said shell, locking means operatively associated with said base and shell for releasably locking said base to said shell so that when said shell is lifted, said base will be attached thereto and form a unit therewith, said locking means being constructed so as to automatically engage upon properly seating said shell on said base, means on said shell operable for releasing said locking means, and means to prevent the operation of said releasing means when said base is being carried by said shell.

4. A portable electric cooker comprising a base provided with a cooking surface, said base being provided with a marginal seat, a shell having a marginal seat along its lower edge cooperable with said base seat to locate and removably support said shell upon said base, said shell cooperating with said base to define a cooking well having a rim at the upper end of said well, a cooking pan adapted to be supported by said rim and to be arranged in said well, a cover for said pan, handles on said shell, locking means operatively associated with said base and shell for releasably locking said shell to said base, a release for said locking means including an operator positioned adjacent said handles, and means to prevent the actuation of said operator when said shell and base are being carried by said handles.

5. A portable electric cooker comprising a base provided with a cooking surface, said base being provided with a marginal seat, a shell having a marginal seat along its lower edge cooperable with said base seat to locate and support said shell upon said base, said shell cooperating with said base to define a cooking well, a cooking pan adapted to be supported and arranged in said well, a cover for said pan, handles on said shell, locking means operatively associated with said base and shell for releasably locking said shell to said base, a release for said locking means including an operator positioned adjacent said handles, and means responsive to a lifting of the base from a supporting surface for disabling the lock releasing means.

GEORGE P. ANDERSON.

REFERENCES CITED

The following references are of record in the file of this patent:

UNITED STATES PATENTS

| Number | Name | Date |
| --- | --- | --- |
| 1,005,357 | Sykes | Oct. 10, 1911 |
| 1,006,104 | Kuhn et al. | Oct. 17, 1911 |
| 1,043,667 | Carpenter | Nov. 5, 1912 |
| 1,047,088 | Kuhn | Dec. 10, 1912 |
| 1,086,870 | Sykes | Feb. 10, 1914 |
| 1,392,802 | Serrell | Oct. 4, 1921 |
| 1,428,825 | Bindon | Sept. 12, 1922 |
| 1,759,957 | Reichart | May 27, 1930 |
| 2,147,319 | Smith | Feb. 14, 1939 |
| 2,266,901 | Parsons | Dec. 23, 1941 |
| 2,305,056 | Austin | Dec. 15, 1942 |
| 2,321,850 | Pearce | June 15, 1943 |
| 2,341,648 | Parr | Feb. 15, 1944 |

FOREIGN PATENTS

| Number | Country | Date |
| --- | --- | --- |
| 496,724 | France | Aug. 13, 1919 |